United States Patent [19]

Maeda et al.

[11] Patent Number: 4,944,584
[45] Date of Patent: Jul. 31, 1990

[54] PLASTIC MULTIFOCAL POINT SPHERICAL LENS

[75] Inventors: Koichi Maeda; Akio Takigawa; Yasuyoshi Tago, all of Nishinomiya; Motoaki Yoshida, Kawanishi, all of Japan

[73] Assignee: Nippon Sheet Glass Co., Ltd., Osaka, Japan

[21] Appl. No.: 315,258

[22] Filed: Feb. 23, 1989

Related U.S. Application Data

[63] Continuation of Ser. No. 61,592, Jun. 15, 1987, abandoned.

[30] Foreign Application Priority Data

Jun. 14, 1986 [JP] Japan .................................. 61-137295

[51] Int. Cl.$^5$ .......................... G02B 3/10; B29D 11/00
[52] U.S. Cl. .................................... 351/172; 264/1.7; 264/1.8; 350/413
[58] Field of Search .................. 264/1.7, 1.8; 351/168, 351/169, 172; 350/413

[56] References Cited

U.S. PATENT DOCUMENTS

| | | | |
|---|---|---|---|
| 3,485,556 | 12/1969 | Naujokas | 264/1.8 |
| 4,208,362 | 6/1980 | Deichert et al. | 264/1.7 |
| 4,701,288 | 10/1987 | Cook et al. | 264/1.7 |

FOREIGN PATENT DOCUMENTS

| | | | |
|---|---|---|---|
| 74501 | 4/1984 | Japan | 264/1.7 |
| 1029766 | 5/1966 | United Kingdom | 351/169 |

Primary Examiner—James Lowe
Attorney, Agent, or Firm—Pollock, Vande Sande & Priddy

[57] ABSTRACT

A plastic multifocal point spherical lens comprising a unitary structure of (A) a first synthetic resin layer having a fixed refractive index, (B) a second synthetic resin layer having a substantially fixed refractive index different from the refractive index of the first synthetic resin layer, and (C) a third synthetic resin layer existing between the first synthetic resin layer and the second synthetic resin layer and having a refractive index gradient varying continuously from the refractive index of the first synthetic resin layer to that of the second synthetic resin layer, part of the second synthetic resin layer and part of the third synthetic resin layer together being recessed into the first synthetic resin layer, and the second synthetic resin layer being thicker at the recessed part than the rest. The lens is prepared by (1) partially polymerizing a first monomer to form a partially polymerized molded mass, (2) applying a second monomer to substantially the entire surface of the partially polymerized molded mass, and (3) after part of the second monomer has diffused into the partially polymerized molded mass, subjecting the entire monomers to polymerization reaction and substantially completing the polymerization.

2 Claims, 2 Drawing Sheets

PLASTIC MULTIFOCAL POINT SPHERICAL LENS

This application is a continuation of U.S. Pat. Ser. No. 07/061,592 filed on June 15, 1987, and now abandoned.

BACKGROUND OF THE INVENTION

1. Field of the Invention

This invention relates to a plastic spherical lens having a multiplicity of focal points, and a method of its production. More specifically, it relates to a multifocal point spherical lens comprising a resin layer having a refractive index gradient nearly throughout the lens, and a small lens portion formed of a resin having a different refractive index from a resin forming the matrix of the spherical lens, and to a method of its production.

2. Description of the Prior Art

With a rapid increase in the proportion of aged people in the total population in recent years, there has been an increasing demand for eye glasses having bifocal, multifocal or cumulative multifocal points.

In the prior art, bifocal or multifocal point eyeglass lenses are generally produced by forming on an eyeglass lens having a fixed radius of curvature a small lens portion having a different radius of curvature by complex machining or by using a special eyeglass lens mold.

However, conventional general bifocal or multifocal point lenses are not suitable for use as eyeglass lenses which also require fashionability as an important element because the protrusion of the small lens portion is conspicuous on the surface of the parent lens.

Furthermore, these lenses including cumulative multifocal point lenses require complex machining, and the cost of production becomes very high Hence, the increased price of the final products is a major cause of retarded acceptance of such lenses despite a large latent demand for them.

Japanese Laid-Open Patent Publication No. 201216/1982 describes a multifocal point organic lens having a non-uniform refractive index consisting of a multifocal point organic lens substrate having a uniform refractive index and an organic substance having a different refractive index from the lens substrate diffused and polymerized on either one of a far view portion or a near view portion of the lens substrate. According to the description of this patent document, this multifocal point organic lens is produced by masking the surface of the parent lens except a region on which to form the small lens, applying an organic substance having a different refractive lens from the parent lens to the small lens-forming region, and diffusing the organic substance in the parent lens and polymerizing it to thereby form a small lens portion having a refractive index gradient. It is very difficult, or virtually impossible, however to diffuse the organic substance only in the unmasked portion and polymerize it. After the end of polymerization, an after-step of polishing and removing the resulting polymer of the organic substance formed in unwanted parts is required. Furthermore, this method can produce only a spherical lens with a relatively small area of the small lens portion.

Japanese Laid-Open Patent Publication No. 120217/1983 proposes a method of producing a bifocal or multifocal point lens having a fixed radius of curvature which comprises producing a parent lens so that it can receive a small lens therein, fixing the small lens to the parent lens by bonding or otherwise, and then polishing the entire parent lens to a uniform curvature. According to this method, the adhesion between the parent lens and the small lens is a problem, and this problem is particularly difficult to solve when the materials of the parent lens and the small lens have a large difference in the coefficient of thermal expansion. Furthermore, since the thickness of the parent lens cannot be made too large in view of fashionability or weight, it is impossible to increase the thickness of the small lens portion or to reduce the radius of curvature of the small lens portion too much. For this reason, it is difficult to change the focal length of the small lens portion greatly from that of the parent lens by the above method, and further, this method essentially requires an after-step of polishing the entire lens surface. Thus, when it is desired to obtain a lens having greatly varying focal lengths, it is necessary to select a monomer (or a monomeric mixture) which when converted to a polymer, has a refractive index greatly different from that of the parent lens, and also possesses other properties which make it withstand use as an eyeglass In the case of ordinary bifocal, multifocal, or cumulative focal point eyeglass lenses, the focal length of the small lens should be made shorter than that of the parent lens Hence, the above method requires selection of a monomer (or a monomeric mixture) having a very high refractive index Since in this case, dispersion becomes considerably great, the resulting lens has the defect of marked chromatic aberration Recently, cumulative multifocal point eyeglass lenses have attracted attention which are produced by working eyeglass lenses having a fixed radius of curvature to render them non-spherical, or by using an eyeglass lens mold having a special non-spherical shape. Such methods have the same problems as described above.

SUMMARY OF THE INVENTION

It is an object of this invention to provide a plastic multifocal point lens

Another object of this invention is to provide a plastic multifocal point lens comprising a plastic layer having a refractive index gradient over nearly the entire spherical lens surface and a small lens portion formed of a resin having a different refractive index from the resin forming the matrix of the spherical lens.

Still another object of this invention is to provide a plastic multifocal point lens which is provided with a plastic layer having a refractive index gradient over nearly the entire spherical lens surface, and in which the spherical aberration is corrected by the presence of the plastic layer.

Yet another object of this invention is to provide a plastic multifocal point lens which can be produced very easily, and a method of its production.

Other objects of this invention along with its advantages will become apparent from the following description.

According to this invention, the above objects and advantages of the invention are achieved by a plastic multifocal point spherical lens comprising a unitary structure of (A) a first synthetic resin layer having a fixed refractive index, (B) a second synthetic resin layer having a substantially fixed refractive index different from the refractive index of the first synthetic resin layer, and (C) a third synthetic resin layer existing between the first synthetic resin layer and the second synthetic resin layer and having a refractive index gradient varying continuously from the refractive index of the first synthetic resin layer to that of the second synthetic resin layer, part of the second synthetic resin layer and part of the third synthetic resin layer together being recessed into the first synthetic resin layer, and the second synthetic resin layer being thicker at the recessed part than the rest.

According to this invention, the above lens can be produced by a method which comprises (1) partially polymerizing a first monomer or monomeric mixture in a mold to form a partially polymerized molded mass having one or more recessed portions on its surface, (2) applying a second monomer or monomeric mixture different from the first monomer or monomeric mixture to substantially the entire surface having one or more recessed portions of the partially polymerized molded mass, and (3) after part of the second monomer or monomeric mixture has diffused into the partially polymerized molded mass, subjecting the entire monomers to polymerization reaction and substantially completing the polymerization.

DETAILED DESCRIPTION OF THE INVENTION

Figure 1:
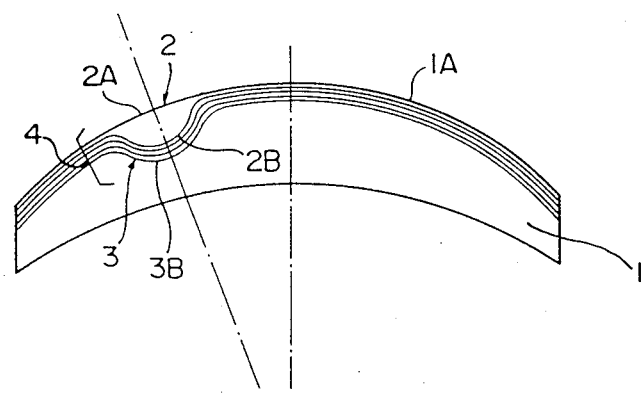
FIG. 1 is a sectional view showing an example of the spherical lens of this invention.

In the step (1) of the method of this invention, the first monomer or monomeric mixture is partially polymerized in a mold. If the first monomer or monomeric mixture is substantially completely polymerized, the second monomer to be subsequently applied is difficult of diffusing into the polymer mass, and therefore, phase separation occurs relatively easily between the polymer of the first monomer or monomeric mixture and the polymer of the second monomer.

According to the step (1), a partially polymerized molded mass is formed. Depending upon the mold used, the mass has one or more recessed portions. The recessed portions may be part of a spherical surface or a parabolic surface. Preferably, the partial polymerization is carried out until the polymerization conversion reaches about 10 to 90%, more preferably about 20 to 80%.

According to the step (2) of the method of this invention, the second monomer or monomeric mixture is applied to the partially polymerized molded mass formed in step (1). The second monomer or monomeric mixtures differs from the first monomer or monomeric mixture. Hence, the first monomer or monomeric mixture and the second monomer or monomeric mixture can give polymers having different refractive indices. Either one of the first monomer or monomeric mixture and the second monomer or monomeric mixture may give a polymer having a higher refractive index than the other.

Examples of the monomers used in the steps (1) and (2) include diethylene glycol bisallyl carbonate (CR-39), tetrabromobisphenol A diethoxy methacrylate, p bromostyrene, styrene, vinyl acetate, vinyl chloride, acrylonitrile, allyl cinnamate, benzyl acrylate, diallyl isophthalate, tetrabromobisphenol A diallyl carbonate, vinyl benzoate, dicyclopentenyloxy ether acrylate, tetrabromophenyl methacrylate, polyethylene glycol dimethacrylate, diallyl phthalate, benzyl methacrylate, phenyl methacrylate and ethylene glycol dimethacrylate.

Of these, CR-39 (the refractive index, np, of the polymer is 1.501), a mixture of tetrabromobisphenol A diethoxy methacrylate, p-bromostyrene, styrene and allyl cinnamate (the np of the copolymer is, for example, 1.595), a mixture of CR-39, benzyl acrylate and diallyl isophthalate (the np of the copolymer is, for example, 1.545), a mixture of tetrabromobisphenol A diallyl carbonate and vinyl benzoate (the np of the copolymer is, for example, 1.592), and a mixture of dicyclopentenyloxy ether acrylate, tetrabromophenyl methacrylate and polyethylene glycol dimethacrylate (the np of the copolymer is, for example, 1.565), for example, are preferred as the first monomer or monomeric mixture.

Preferred as the second monomer or monomeric mixture are, for example, diallyl phthalate (np of the polymer is 1.572), benzyl methacrylate (the np of the polymer is 1.5680), vinyl benzoate (the np of the polymer is 1.5775), phenyl methacrylate, butadiene, and mixtures of these monomers with ethylene glycol dimethacrylate or CR-39).

The second monomer or monomeric mixture applied to the partially polymerized molded mass formed in step (1) diffuses into the partially polymerized molded mass, and at the same time fills up the recessed portion(s) formed in it.

In this state, the entire mass is subjected to polymerization reaction in step (3). In that area of the partially polymerized molded mass where the second monomer or monomeric mixture has diffused, copolymerization of the second monomer or monomeric mixture with the first monomer or monomeric mixture present in the mass proceeds, and at the same time, polymerization of the first monomer or monomeric mixture proceeds in that area of the molded mass into which the second monomer or monomeric mixture has not diffused. In addition, the second monomer or monomeric mixture remaining on the partially polymerized molded mass without diffusion polymerizes.

When the aforesaid polymerization reactions are substantially completed, a polymer article is formed which is a unitary laminated structure composed of a first synthetic resin layer having a substantially fixed refractive index and composed of a polymer of the first monomer or monomeric mixture, a second synthetic resin layer having a substantially fixed refractive index different from the refractive index of the first synthetic resin layer and composed of a polymer of the second monomer or monomeric mixture, and a third synthetic resin layer which is composed of a copolymer of the first monomer or monomeric mixture and the second monomer or monomeric mixture and positioned between the first synthetic resin layer and the second synthetic resin layer and has a refractive index gradient varying continuously from the refractive index of the first synthetic resin layer to the refractive index of the second synthetic resin layer.

Since the diffusion of the second monomer or monomeric mixture into the partially polymerized molded mass becomes progressively low in concentration from the surface toward the inside of the partially polymerized molded mass, the refractive index of the third synthetic resin layer located between the first and the second synthetic resin layer varies continuously according to the degree of diffusion of the second monomer.

In the recessed portion of the partially polymerized molded mass, the third synthetic resin layer is formed, and the second monomer or monomeric mixture filling the recessed portion is converted to a polymer. Hence, part of the second synthetic resin layer and part of the third synthetic resin layer together are recessed into the first synthetic resin layer, and the second synthetic resin layer is thicker at the recessed portion than in the rest.

If the mold used for polymerization is a mold for production of spherical lenses, the polymerized article obtained can be formed into the multifocal point spherical lens of the present invention directly or after some post-treatment. When the mold is not for spherical lenses, the resulting polymerized article may be formed into the multifocal point spherical lens of the present invention by polishing.

In the prior art, a multifocal point lens is produced by forming a small lens portion having a different surface curvature from the parent lens. In contrast, in the present invention, the surface curvature of the small lens portion remains the same as the parent lens, and in a part of the parent lens, a lens region having a different refractive index as the parent lens and a region following it and having a refractive index gradient are provided to form an independent small lens portion. Hence, according to this invention, the small lens portion does not protrude on the surface of the parent lens as in the conventional product. Thus, the multifocal point lens of the invention can be formed as an ordinary eyeglass lens having a single surface-curvature, and from the viewpoint of fashionability, a very good multifocal point lens can be provided.

In the multifocal point lens of the present invention, the partially polymerized matrix of spherical lens having one or more recessed portions (first synthetic resin layer) and the parent lens having no recessed portion (second synthetic resin layer) are chemically bonded firmly to each other via the third synthetic resin layer, and there is no problem in the adhesion of these layers.

The small lens portion present in the multifocal point lens of the invention is comprised of a lens (second synthetic resin layer) having a uniform refractive index different from the parent lens (first synthetic resin layer) and a lens having a refractive index gradient (third synthetic resin layer). It is easy therefore to form the small lens portion having a large difference in focal length from the parent lens without the need to reduce the radius of curvature of the small lens portion too much, increase the refractive index gradient too much, or to select a monomer which when converted to a polymer, has a refractive index greatly different from that of the parent lens.

Furthermore, according to the method of this invention, the second monomer or monomeric mixture diffuses faithfully along the surface contour of the parent lens (first synthetic resin layer), and a contour line of refractive index is obtained in a surface region of the parent lens including a region following the recessed portion. Thus, a multifocal point lens in which only the area of the recessed portion constitutes the small lens portion can be produced.

The multifocal point lens produced by the invention does not always require a complex after-step such as polishing its surface layer, and the present invention can easily give multifocal point lenses having excellent fashionability at low costs on a mass-production basis.

The invention is more specifically described below with reference to the accompanying drawings.

With reference to FIG. 1, one embodiment of the multifocal lens of this invention is comprised of a parent lens member 1 composed of a spherical lens formed of a transparent synthetic resin having a uniform refractive index, and embedded integrally in part of it, a small lens portion 4 composed of a lens region 2 having a refractive index different from the parent lens (a lens region having a uniform refractive index) and a lens region 3 having a refractive index gradient and following the region 2.

In the small lens portion 4, the lens region 2 having a uniform refractive index is composed of a surface 2A having the same spherical surface as, and being continuous to, the lens surface 1A of the parent lens member 1 and an oppositely facing surface 2B. In the lens region 3 having a refractive index gradient, a contour line of refractive index is formed in the same shape as the surface 2B of the lens region 2, and the lens region 3 has a refractive index gradient in which the refractive index gradually decreases (or increases) as it departs from the surface 2B. A boundary surface 3B with a uniform refractive index is also formed.

In other words, the small lens 4 composed of the lens region 2 having a uniform refractive index and the lens region 3 having a refractive index gradient are integrally embedded within the parent lens member 1.

The small lens portion 2 has a different focal length from the parent lens member 1. For example, if the small lens portion 2 has a higher refractive index from the parent lens member 1, the small lens portion 2 has a shorter focal length than the parent lens, and if it has a lower refractive index than the parent lens member 1, it has a longer focal length than the parent lens member.

The small lens portion 2 may be formed on the concave surface side in FIG. 1 instead of the site shown in FIG. 1. A plurality of such small lens portions may be provided in one lens.

The method of producing the multifocal point lens of the invention will now be described more specifically with reference to FIG. 2.

Figure 2A:
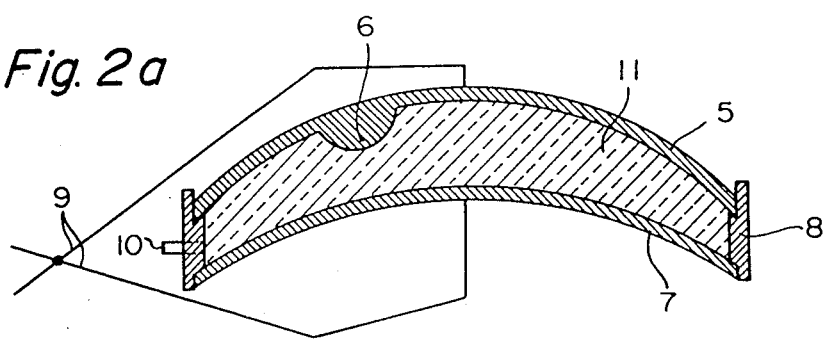
FIGS. 2a and b are views showing molds used in the method of producing the spherical lens of this invention, FIG. 2a being an explanatory view for illustrating a first step of the method of this invention and FIG. 2b being an explanatory view showing a second and a third step of the method.

As shown in FIG. 2a, a eyeglass lens mold (spherical surface) 5 having a protruding portion 6 on its inside surface is provided. Such a mold may be formed by bonding or melt-bonding the protruding part 6 to an ordinary eyeglass lens mold, or a eyeglass lens mold having the shape shown in FIG. 2a may be provided in advance. In FIG. 2a, the protruding portion is provided in the upper eyeglass lens mold member, but it may be provided in the lower mold member, or in both. As in the production of an ordinary single focal point eyeglass lens, an eyeglass lens mold shown in FIG. 2a may be set by using the mold 5, an ordinary eyeglass lens mold 7, a gasket 8 and a spring 9. A monomer (meant to include a monomeric mixture) Ma which is to form a network polymer (meant to include a polymer) Pa having a refractive index Na is completely filled into the eyeglass lens mold through an injection port 10. By, for example, heating the entire eyeglass lens mold, the monomer Ma is partially polymerized to form a partially polymerized transparent gel 11 having a polymerization conversion of preferably 10 to 90%, more preferably 20 to 80%.

The monomer Ma which can be used in this invention may be, for example, diethylene glycol bisallyl carbonate used in great quantities for plastic eyeglass lenses, and any other monomers which can form transparent crosslinked polymers which have the basic properties required of eyeglass lenses.

The eyeglass lens mold 5 is carefully removed from the transparent gel 11 formed as above. Since the eye glass mold is under pressure by means of the spring 9, the inside surface shape of the eyeglass lens mold 5 is faithfully transferred to the surface of the resulting transparent gel 11. Then, a very thin spacer is set at the stepped part of the gasket 8 on which to mount the eyeglass lens mold, an ordinary eyeglass lens mold 13 having no protruding portion is mounted on it. A space having the same thickness as the thickness of the spacer 12 is formed between the transparent gel 11 and the eye glass lens mold 13. A monomer (meant to include a monomeric mixture 14 forming a polymer (meant to include a copolymer) having a refractive index Nb different from the refractive index Nb is completely filled into this space through the gasket 8 by using a syringe or the like.

Thereafter, the entire eyeglass lens mold assembly is maintained at a certain temperature for a certain period of time. The monomer Mb diffuses from the surface of the transparent gel 11 along its surface shape and simultaneously copolymerizes. Treatment such as post heating completes the polymerization. The unreacted monomer in the transparent gel diffuses in a small amount in the recessed portion of the transparent gel. But as shown at 2 and 3 in FIG. 1, a lens region having a uniform refractive index composed of polymer Pb derived from the monomer Mb and a lens region following it and having a refractive index gradient with the same coutour line of refractive index as the recessed portion attributed to the concentration gradient of the monomer Mb are formed. As a result, the small lens portion 4 shown in FIG. 1 composed of these two regions are formed at the same time.

If Na is larger than Nb, the resulting small lens portion has a concave lens action. If Na is smaller than Nb, it shows a convex lens action.

The monomer Mb used in the invention may be one which forms a linear polymer or a crosslinked polymer when polymerized. Preferably it forms a crosslinked polymer. Accordingly, when a monomer forming a linear polymer is to be used, it is preferred to add a crosslinking agent.

By the method of this invention, it is also possible to produce a novel cumulative multifocal point lens having a fixed radius of curvature. This may be achieved by shaping the protruding portion 6 of the eyeglass lens mold 5 shown in FIG. 2a in such a nonspherical surface shape that the radius of curvature continuously changes from the center toward the periphery of the protruding portion. In ordinary cumulative multifocal point eyeglass lenses, the radius of curvature is progressively increased from the center toward the periphery of the protruding portion and is finally made equal to the radius of curvature of the inside surface of the eyeglass lens mold.

Since by so doing, the focal length varies gently and continuously from the center toward the periphery in both of the lens region having a uniform refractive index and the lens region having a refractive index gradient, and the boundary surface between the small lens portion and the parent lens is not clear, and there is continuity between them. Hence, a cumulative multifocal point lens having a fixed radius of curvature is produced.

The following Examples illustrate the invention more specifically.

EXAMPLE 1

(1) Benzoyl peroxide (BPO) as a polymerization initiator was added in an amount of 3% by weight to diethylene glycol bisallyl carbonate (CR-39) which is normally used in great quantities in plastic eyeglass lenses and when polymerized, has a refractive index of 1.5001, and completely dissolved. The prepared mixture was completely filled in a eyeglass lens mold assembly of the type shown in FIG. 2a through a gasket 10, and the mold was sealed with the gasket. The mold assembly shown in FIG. 2a was comprises of a eyeglass lens upper mold 5 on which a semispherical protruding portion 6 was placed, an eyeglass lens lower mold 7 used in the production of ordinary spherical eyeglass lenses, gaskets 8 and 10 and a spring 9. The spherical lens obtained by using this mold assembly had a focal point of 500 mm (2 degrees) and its protruding portion had a diameter of 25 mm and a depth of 3 mm.

The mold assembly in which CR-39 was filled was heated at 77° C. for 57 minutes. Thereafter, the upper mold 5 was carefully removed. A partially polymerized transparent gel 11 was formed in which the semispherical protruding portion of the mold 5 was transferred faithfully on the surface as a recessed portion. This transparent gel 11 had a polymerization conversion of about 40%.

Figure 2B:
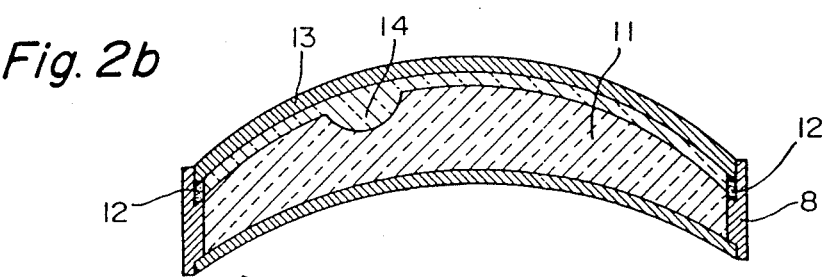

(2) Then, as shown in FIG. 2b, a spacer 12 having a thickness of 0.7 mm was set on the stepped portion of the gasket 8 on which to mount an eyeglass lens mold. An ordinary eyeglass lens mold 13 having no protruding portion was then mounted on the stepped portion, and a spring 9 was set on the entire eyeglass lens mold assembly. A space having clearance of 0.5 mm slightly smaller than the thickness of the spacer 12 was formed between the surface of the transparent gel 11 and the eyeglass lens mold 13. Benzyl methacrylate (BZMA) 14 whose polymer had a refractive index of 1.5680 was completely filled in the space by means of a syringe through the gasket 8.

Then, the entire eyeglass lens mold assembly was maintained at 50° C. for 5 hours, at 60° C. for 5 hours, at 80° C. for 8 hours, and further at 90° C. for 8 hours. Thereafter, the polymer was taken out from the eyeglass lens mold assembly. There was obtained a bifocal point eyeglass lens with a fixed radius of curvature which had quite a smooth surface and required no polishing and also had good adhesion between the small lens portion and the parent lens. The small lens portion had a diameter of 28 mm, and the focal length was 250 mm (4 degrees).

EXAMPLE 2

(1) BPO was added in a proportion of 3% by weight to CR-39, and the mixture was completely filled in an eyeglass lens assembly of the type shown in FIG. 2a adapted to give an eyeglass lens having a focal length of 500 mm (2 degrees). At this time, the semi-spherical protruding portion 6 provided in the inside surface of the eyeglass lens mold 5 had a diameter of 20 mm and a thickness of 3 mm. The entire eyeglass lens mold assembly was heated at 73° C. for 105 minutes to obtain a partially polymerized transparent gel having a polymerization conversion of about 45%.

(2) The, the eyeglass lens mold 5 was carefully removed from the transparent gel, and as in Example 1, a spacer having a thickness of 0.7 mm was set on the gasket. Then, an eyeglass lens mold having no protruding portion was set on the spacer, and a spring was set on the entire eyeglass lens assembly. Vinyl benzoate (VB) whose polymer had a refractive index of 1.5680 was completely filled between the transparent gel and the eyeglass lens mold.

Thereafter, the entire eyeglass lens assembly was maintained at 40° C. for 3 hours, at 50° C. for 3 hours, at 60° C. for 4 hours, at 80° C. for 8 hours, and at 90° C. for 2 hours. The polymer was then taken out from the eyeglass lens mold. There was obtained a bifocal point eyeglass lens with a fixed radius of curvature which had a smooth surface requiring no polishing, and good adhesion between the small lens portion and the parent lens. The small lens portion had a diameter of about 22 mm, and the focal length was 290 mm (about 4.5 degrees).

Figure 3:
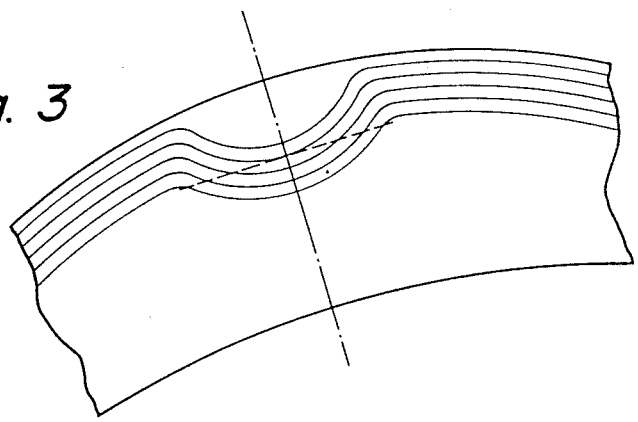
FIG. 3 is a sectional view of the spherical lens for showing the sites of measurement of the refractive index distribution of a lens having a refractive index gradient formed beneath a lens having a uniform refractive index.
Figure 4:
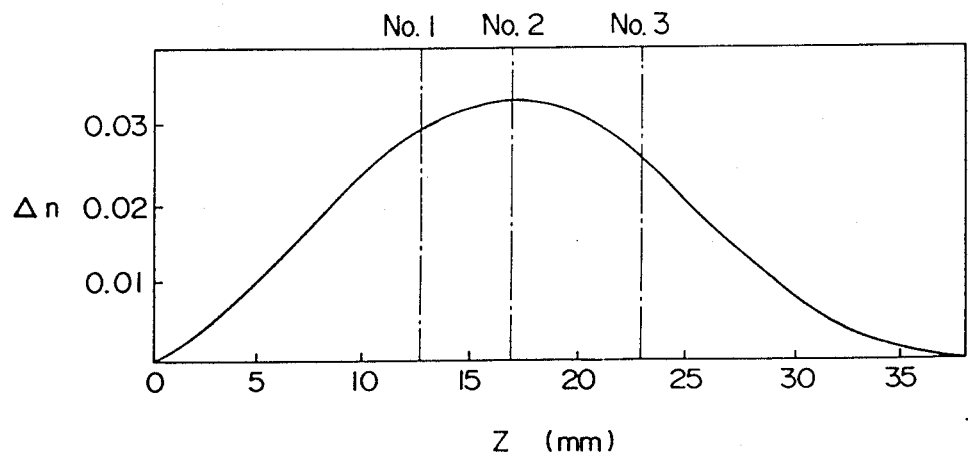
FIG. 4 is a view showing a refractive index distribution measured at the measuring sites shown in FIG. 3.
Figure 5:
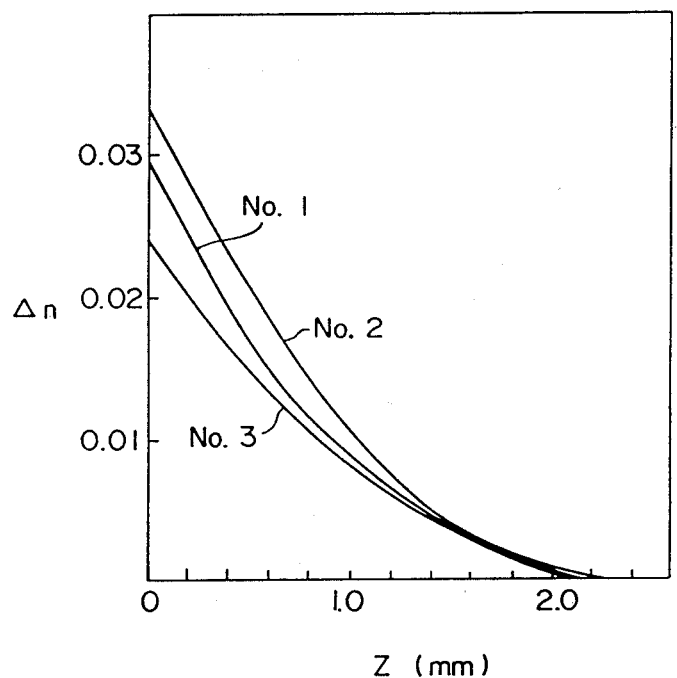
FIG. 5 is a view showing the results of measurement of the refractive index distribution along the line drawn in FIG. 4.

The refractive index distribution is formed beneath the lens region having a uniform refractive index was measured by an interference microscope along the broken line shown in FIG. 3. The results shown in FIG. 4 were obtained. The refractive index distribution was further measured along the lines Nos. 1, 2 and 3 in FIG. 4. The results are shown in FIG. 5.

EXAMPLE 3

(1) BPO was added in a proportion of 3% by weight to CR-39, and the mixture was filled completely in an eyeglass lens assembly adapted to give an eyeglass lens having a focal length of 500 mm (2 degrees). At this time, the semi-spherical protruding portion 6 had a diameter of 25 mm and a thickness of 3.2 mm. The entire eyeglass lens assembly was heated at 77° C. for 57 minutes to give a partially polymerized transparent gel having a polymerization conversion of about 40%.

(2) The eyeglass lens mold 5 was carefully removed from the transparent gel, and as in Examples 1 and 2, a spacer having a thickness of 0.7 mm was set in the gasket portion. An eyeglass lens mold having no protruding portion was mounted on the spacer, and then a spring was set over the entire eyeglass lens mold assembly. A monomeric mixture of BZMA and CR-39 (1:1) was completely filled between the transparent gel and the eyeglass lens mold.

Thereafter, the entire eyeglass lens assembly was maintained at 40° C. for 4 hours, at 50° C. for 4 hours, at 60° C. for 4 hours, at 80° C. for 8 hours, and at 90° C. for 2 hours. The polymer was then taken out from the eyeglass lens mold. There was obtained a bifocal point eyeglass lens with a fixed radius of curvature which had a smooth surface requiring on polishing, and good adhesion between the small lens portion and the parent lens. The small lens portion had a diameter of about 28 mm, and the focal length was 250 mm (about 4 degrees). The lens had no chromatic aberration which gives rise to a problem in practical application.

What is claimed is:

1. A plastic multifocal point spherical lens comprising a unitary structure of
(A) a first synthetic resin layer having a fixed refractive index,
(B) a second synthetic resin layer having a substantially fixed refractive index different from the refractive index of the first synthetic resin layer and
(C) a third synthetic resin layer existing between the first synthetic resin layer and the second synthetic resin layer and having a refractive index gradient varying continuously from the refractive index of the first synthetic resin layer to that of the second synthetic resin layer, part of the second synthetic resin layer and part of the third synthetic resin layer together being recessed into the first synthetic resin layer, and the second synthetic resin layer being thicker at the recessed part than the rest, said recessed part having either a spherical surface or a parabolic surface.

2. The lens of claim 1 wherein said first, second, and third synthetic resin layers are discrete layers.

* * * * *